United States Patent
Xia et al.

(10) Patent No.: US 10,817,439 B2
(45) Date of Patent: Oct. 27, 2020

(54) METHOD AND APPARATUS FOR TRANSMITTING A MESSAGE

(71) Applicant: BEIJING BAIDU NETCOM SCIENCE AND TECHNOLOGY CO., LTD., Beijing (CN)

(72) Inventors: Liming Xia, Beijing (CN); Jingchao Feng, Beijing (CN); Quan Wang, Beijing (CN); Ning Qu, Beijing (CN); Wei He, Beijing (CN); Chengliang Deng, Beijing (CN); Kaiwen Feng, Beijing (CN); Zhuo Chen, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 161 days.

(21) Appl. No.: 15/410,680

(22) Filed: Jan. 19, 2017

(65) Prior Publication Data
US 2018/0052783 A1 Feb. 22, 2018

(30) Foreign Application Priority Data
Aug. 19, 2016 (CN) .......................... 2016 1 0693101

(51) Int. Cl.
G06F 13/16 (2006.01)
G06F 12/1072 (2016.01)
G06F 15/167 (2006.01)

(52) U.S. Cl.
CPC ...... *G06F 13/1663* (2013.01); *G06F 12/1072* (2013.01); *G06F 15/167* (2013.01); *G06F 2212/1044* (2013.01)

(58) Field of Classification Search
CPC ... G06F 12/00–116; G06F 13/00–4295; G06F 15/167; G06F 13/1652–1663; G06F 15/163–17393
See application file for complete search history.

(56) References Cited

U.S. PATENT DOCUMENTS

| 4,851,988 A | * | 7/1989 | Trottier | ................. G06F 15/167 |
| | | | | 709/226 |
| 5,984,499 A | * | 11/1999 | Nourse | .............. G05B 19/4145 |
| | | | | 700/169 |

(Continued)

FOREIGN PATENT DOCUMENTS

| CN | 103197958 A | 7/2013 |
| CN | 103984655 A | 8/2014 |

*Primary Examiner* — Nicholas J Simonetti
(74) *Attorney, Agent, or Firm* — Marshall, Gerstein & Borun LLP (57) ABSTRACT

The present application discloses a method and an apparatus for transmitting a message. The method of an embodiment comprises: dividing a shared memory area allocated by an operating system into a plurality of memory blocks for storing messages having different priorities; dividing each memory block in the plurality of memory blocks into at least one memory unit having a successive serial number; determining, from the plurality of memory blocks according to a priority of a to-be-transmitted message, a target memory block for storing the to-be-transmitted message; and writing the to-be-transmitted message into a memory unit of the target memory block. This embodiment implements message transmission based on priorities of the messages, and improves the control security of an intelligent control system.

12 Claims, 4 Drawing Sheets

(56) References Cited

U.S. PATENT DOCUMENTS

| | | | |
|---|---|---|---|
| 6,785,892 B1* | 8/2004 | Miller | G06F 15/167 |
| | | | 712/203 |
| 9,037,838 B1* | 5/2015 | Shubel | G06F 3/0656 |
| | | | 712/225 |
| 2003/0088626 A1* | 5/2003 | Gupta | G06F 15/16 |
| | | | 709/206 |
| 2005/0021195 A1* | 1/2005 | Zeitler | G05D 1/024 |
| | | | 701/23 |
| 2016/0378381 A1* | 12/2016 | Hughes, Jr. | G06F 15/167 |
| | | | 711/163 |
| 2017/0187496 A1* | 6/2017 | Shalev | H04L 45/74 |

* cited by examiner

METHOD AND APPARATUS FOR TRANSMITTING A MESSAGE

CROSS REFERENCE TO RELATED APPLICATION

This application claims the priority of Chinese Patent Application No. 201610693101.0, entitled "Method and Apparatus for Transmitting a Message," filed on Aug. 19, 2016, the content of which is incorporated herein by reference in its entirety.

TECHNICAL FIELD

The present application relates to the field of computer technology, specifically to the field of information transmission technologies, and more specifically to a method and an apparatus for transmitting a message.

BACKGROUND

With the rapid development of information technology, intelligent control of increasingly more devices has been achieved. For example, the intelligent control of an unmanned vehicle is achieved by a vehicle-mounted intelligent brain, and the vehicle-mounted intelligent brain controls the driving of the unmanned vehicle by sending control instructions such as acceleration, deceleration, turning and so on. Numerous types of messages need to be transmitted when a device is under the intelligent control, some messages must be thereby responded prior to other messages. For example, when a passenger suddenly appears in front of an unmanned vehicle during the normal driving of the vehicle, the vehicle-mounted intelligent controller will issue an emergency brake instruction which needs to be executed immediately to ensure the safety of the passenger and the vehicle.

At the present, an intelligent control system may adopt a socket communication approach, in which a sending node and a receiving node write messages to and read messages from a buffer queue in the communication process to implement the message transmission. However, the buffer queue adopts a first input first output (FIFO) mechanism in the process of reading and writing messages, whereby the receiving node sequentially reads messages written by the sending node to the queue, and the message sent first is read by the receiving node first. This communication approach does not process differentially according to the urgencies of the messages, and usually presents a severe potential safety hazard to humans as well as the equipment.

SUMMARY

An objective of the present application is to provide an improved method and apparatus for transmitting a message, to solve the technical problem mentioned in the Background.

In the first aspect, the present application provides a method for transmitting a message, wherein the method comprise: dividing a shared memory area allocated by an operating system into a plurality of memory blocks for storing messages having different priorities; dividing each memory block in the plurality of memory blocks into at least one memory unit having a successive serial number; determining, from the plurality of memory blocks according to a priority of a to-be-transmitted message, a target memory block for storing the to-be-transmitted be-transmitted message; and writing the to-be-transmitted message into a memory unit of the target memory block.

In some embodiments, the writing the to-be-transmitted message into a memory unit of the target memory block comprises: determining, from the target memory block, a memory unit being currently unwritten, as a to-be-written memory unit of the to-be-transmitted message; writing the to-be-transmitted message into the to-be-written memory unit after the to-be-written memory unit being locked; and unlocking the to-be-written memory unit in response to completion of the writing to the to-be-written memory unit, and sending, through broadcasting, a notification of the completion.

In some embodiments, the dividing a shared memory area allocated by an operating system into a plurality of memory blocks for storing messages having different priorities comprises: dividing the shared memory area allocated by the operating system into a normal-priority memory block and at least one high-priority memory block, wherein, the priorities of the messages comprise a normal priority and different levels of high priorities, the number of the levels of the high priorities corresponds to the number of the at least one high-priority memory block, the normal-priority memory block is used for storing a message having a priority of the normal priority, and each of the high-priority memory blocks is used for storing messages having the different levels of high priorities respectively.

In some embodiments, when the priority of the to-be-transmitted message is a high priority, the method further comprises: setting, after writing the to-be-transmitted message into the memory unit of the target memory block, a flag bit of the memory unit to true.

In the second aspect, the present application provides a method for transmitting a message, the method comprising: mapping an address of a shared memory area of an operating system into own address space, the shared memory area comprising a normal-priority memory block and at least one high-priority memory block, each comprising at least one memory unit having a successive serial number; searching a presence of a memory unit having a flag bit being true in the at least one high-priority memory block, in response to completing reading a message in a memory unit of the normal-priority memory block; and if present, reading the message from the memory unit having the flag bit being true, and setting the flag bit to false after completing the reading.

In some embodiments, the method further comprises: if not present, reading a message stored in a memory unit next to a memory unit lastly read in the normal-priority memory block.

In some embodiments, the normal-priority memory block is configured to store a message having a priority of a normal priority, and each high-priority memory block in the at least one high-priority memory block is configured to respectively store messages having different levels of high priorities; and the searching a presence of a memory unit with a flag bit being true in the at least one high-priority memory block comprises: searching sequentially, in a descending order of the priorities of the stored messages, whether a flag bit of each memory unit in the at least one high-priority memory block is true, wherein the determining in each high-priority memory block is carried out sequentially according to serial numbers of the memory units.

In the third aspect, the present application provides an apparatus for transmitting a message, comprising: a first dividing module, configured to divide a shared memory area allocated by an operating system into a plurality of memory blocks for storing messages having different priorities; a second dividing module, configured to divide each memory block in the plurality of memory blocks into at least one memory unit having a successive serial number; a determining module, configured to determine, from the plurality of memory blocks according to a priority of a to-be-transmitted message, a target memory block for storing the to-be-transmitted message; and a writing module, configured to write the to-be-transmitted message into a memory unit of the target memory block.

In some embodiments, the writing module is further configured to: determine, from the target memory block, a memory unit being currently unwritten, as a to-be-written memory unit of the to-be-transmitted message; write the to-be-transmitted message into the to-be-written memory unit after the to-be-written memory unit being locked; and unlock the to-be-written memory unit in response to completion of the writing to the to-be-written memory unit, and sending, through broadcasting, a notification of the completion.

In some embodiments, the first dividing module is further configured to: divide the shared memory area allocated by the operating system into a normal-priority memory block and at least one high-priority memory block, wherein, the priorities of the messages comprise a normal priority and different levels of high priorities, the number of the levels of the high priorities corresponds to the number of the at least one high-priority memory block, the normal-priority memory block is used for storing a message having a priority of the normal priority, and each of the high-priority memory blocks is used for storing messages having the different levels of high priorities respectively.

In some embodiments, the apparatus further comprises: a setting module, configured to: set, after writing the to-be-transmitted message into the memory unit of the target memory block, a flag bit of the memory unit to true when the priority of the to-be-transmitted message is the high priority.

In the fourth aspect, the present application provides an apparatus for transmitting a message, comprising: a mapping module, configured to map an address of a shared memory area of an operating system into own address space, the shared memory area comprising a normal-priority memory block and at least one high-priority memory block, each comprising at least one memory unit having a successive serial number; a searching module, configured to search a presence of a memory unit having a flag bit being true in the at least one high-priority memory block, in response to completing reading a message in a memory unit of the normal-priority memory block; and a first reading module, configured to: read the message from the memory unit having the flag bit being true, and set the flag bit to false after completing the reading, if present.

In some embodiments, the apparatus further comprises: a second reading module, configured to: read a message stored in a memory unit next to a memory unit lastly read in the normal-priority memory block if not present.

In some embodiments, the normal-priority memory block is configured to store a message having a priority of a normal priority, and each high-priority memory block in the at least one high-priority memory block is configured to respectively store messages having different levels of high priorities; and the searching module is further configured to search sequentially, in a descending order of the priorities of the stored messages, whether a flag bit of each memory unit in the at least one high-priority memory block is true, wherein the determining in each high-priority memory block is carried out sequentially according to serial numbers of the memory units.

The method for transmitting a message provided in the present application, when sending message, first divides a shared memory area into a plurality of memory blocks for storing messages having different priorities and divides each memory block in the plurality of memory blocks into at least one memory unit having a successive serial number, then determines, from the plurality of memory blocks according to a priority of a to-be-transmitted message, a target memory block for storing the to-be-transmitted message, and finally writes the to-be-transmitted message into a memory unit of the target memory block. When reading message, the method first maps an address of a shared memory area of an operating system into own address space, searches a presence of a memory unit having a flag bit being true in the at least one high-priority memory block, in response to completing reading a message in a memory unit of the normal-priority memory block, and if the memory unit can be found, reads the message from the memory unit having the flag bit being true, and setting the flag bit to false after completing the reading. Therefore, the message can be transmitted according to priorities of the messages, and the control security of an intelligent control system can be improved.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
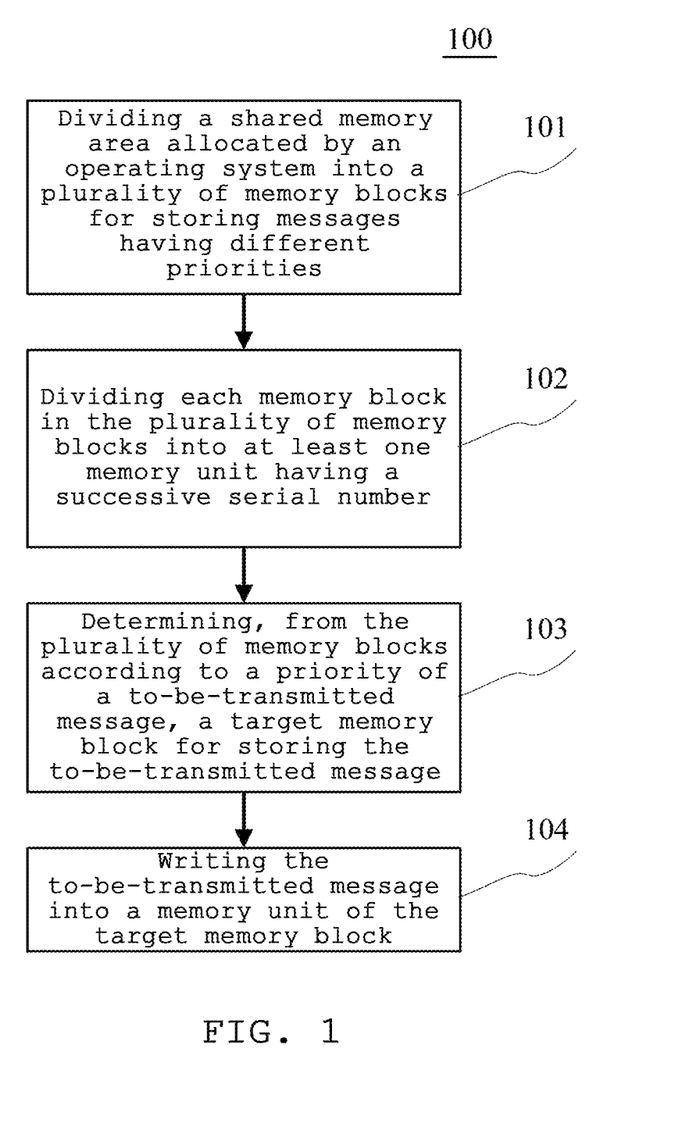
FIG. 1 is a flowchart of an embodiment of a method for transmitting a message according to the present application.

FIG. 1 shows a procedure 100 of an embodiment of a method for transmitting a message according to the present application. The method for transmitting a message comprises the following steps.

At step 101, a shared memory area allocated by an operating system is divided into a plurality of memory blocks for storing messages having different priorities.

In this embodiment, a process of sending a to-be-transmitted message is referred to as a sending process or a sending node, and a process of reading a transmitted message is referred to as a receiving process or a receiving node. The message sent by the sending process to the shared memory area may be various messages that can be transmitted between the processes, for example, it may be a control instruction issued by a vehicle-mounted intelligent brain during driving of an unmanned vehicle. Moreover, the message sent by the sending process to the shared memory area may comprise a field for indicating the priority of the message. After the sending process obtains the shared memory area allocated by the operating system, the shared memory area may be divided into a plurality of memory blocks for storing the messages having different priorities. For example, if the sending process intends to store the messages comprising 4 different levels of priorities (for example, the priorities zero, one, two, and three respectively) in the shared memory area, the shared memory area may be divided into 4 memory blocks for storing the messages whose priorities are zero, one, two, and three respectively. The operating system may be various operating systems, such as a robot operating system (ROS), a Linux operating system, a Unix operating system and so on. The shared memory area may refer to a memory that can be accessed by different processes in a multi-process operating system. It can be understood that, the shared memory area may be requested by the sending process from the operating system.

In some optional implementations of this embodiment, the step 101 of dividing the shared memory area allocated by the operating system into a plurality of memory blocks for storing the messages having different priorities may be performed in the following manner: the sending process may divide the shared memory area allocated by the operating system into a normal-priority memory block and at least one high-priority memory block, wherein, the priorities of the messages may comprise a normal priority and different levels of high priorities, the number of levels of the high priorities corresponds to the number of the at least one high-priority memory block, the normal-priority memory block is configured to store a message having a priority of the normal priority, and the high-priority memory blocks are configured to store messages having different levels of high priorities respectively. For example, the priorities of the messages may comprise the priorities zero, one, two, and three (arranged in a descending order of the priorities), wherein, the priorities zero, one, and two are 3 different levels of high priorities, and the priority three is a normal priority; and then the normal-priority memory block is used to store the message having a priority of three, and the three high-priority memory blocks are used to store the messages whose priorities are zero, one, and two respectively.

At step 102, each memory block in the plurality of memory blocks is divided into at least one memory unit having a successive serial number.

In this embodiment, for each memory block in the plurality of memory blocks divided in step 101, the sending process may divide the memory block into at least one memory unit having the successive serial number. For example, the sending process may divide each memory block into at least one memory unit having the successive serial number according to a frequency of sending the message. For example, the sending process sends 1-10 messages having a priority of zero, one, two or three per second, and then, after the shared memory area is divided into a memory block 0, a memory block 1, a memory block 2, and a memory block 3 for storing messages whose priorities zero, one, two, and three respectively, the memory block 3 may be divided into a memory unit 31, a memory unit 32, a memory unit 33, and a memory unit 34; the memory block 2 may be divided into a memory unit 21, a memory unit 22, and a memory unit 23; the memory block 1 may be divided into a memory unit 11 and a memory unit 12; and the memory block 0 may be used as a memory unit 01. That is, the shared memory area is divided into 10 memory units. It should be noted that, the number of memory units obtained by dividing each memory block is merely used for illustrative description, and is not intended to limit the division number. In a specific implementation process, the sending process may divide each memory block based on proportions of the messages having different levels of priorities in the sent messages.

At step 103, a target memory block for storing a to-be-transmitted message is determined from the plurality of memory blocks according to a priority of the to-be-transmitted message.

In this embodiment, the sending process may find, according to the priority of each to-be-transmitted message, a memory block for storing messages having this priority from the plurality of memory blocks, and determine the memory block as a target memory block for storing the to-be-transmitted message.

At step 104, the to-be-transmitted message is written into a memory unit of the target memory block.

In this embodiment, the sending process may write the to-be-transmitted message into the memory unit of the target memory block determined in step 103.

In some optional implementations of this embodiment, the step 104 of writing the to-be-transmitted message into the memory unit of the target memory block may further be performed in the following manner: first, determining, from the target memory block, the memory unit being currently unwritten as a to-be-written memory unit of the to-be-transmitted message, for example, the sending process may search sequentially according to the serial numbers of the memory units in the target memory block, to obtain the memory unit being currently unwritten as the to-be-written memory unit; next, writing the to-be-transmitted message into the to-be-written memory unit after locking the to-be-written memory unit; and finally, unlocking the to-be-written memory unit in response to completion of the writing into the to-be-written memory unit, and sending, through broadcasting, a notification of the completion.

In some optional implementations of this embodiment, when the priority of the to-be-transmitted message is the high priority, the method for transmitting the message may further comprise: setting a flag bit of the memory unit to true, after the to-be-transmitted message is written into the memory unit of the target memory block. Here, the flag bit of the memory unit being true may indicate that a message is written into the memory unit by the sending process.

The method for transmitting the message provided in the above embodiment of the present application first divides the shared memory area into a plurality of memory blocks for storing messages having different priorities and divides each memory block in the plurality of memory blocks into at least one memory unit having the successive serial number, then determines, from the plurality of memory blocks according to the priority of the to-be-transmitted message, the target memory block for storing the to-betransmitted message, and finally writes the to-be-transmitted message into the memory unit of the target memory block, thereby transmitting the message to the shared memory area according to the priorities of the messages, such that the messages having different priorities can be transmitted differentially, and the control security of an intelligently control system is improved.

Figure 2:
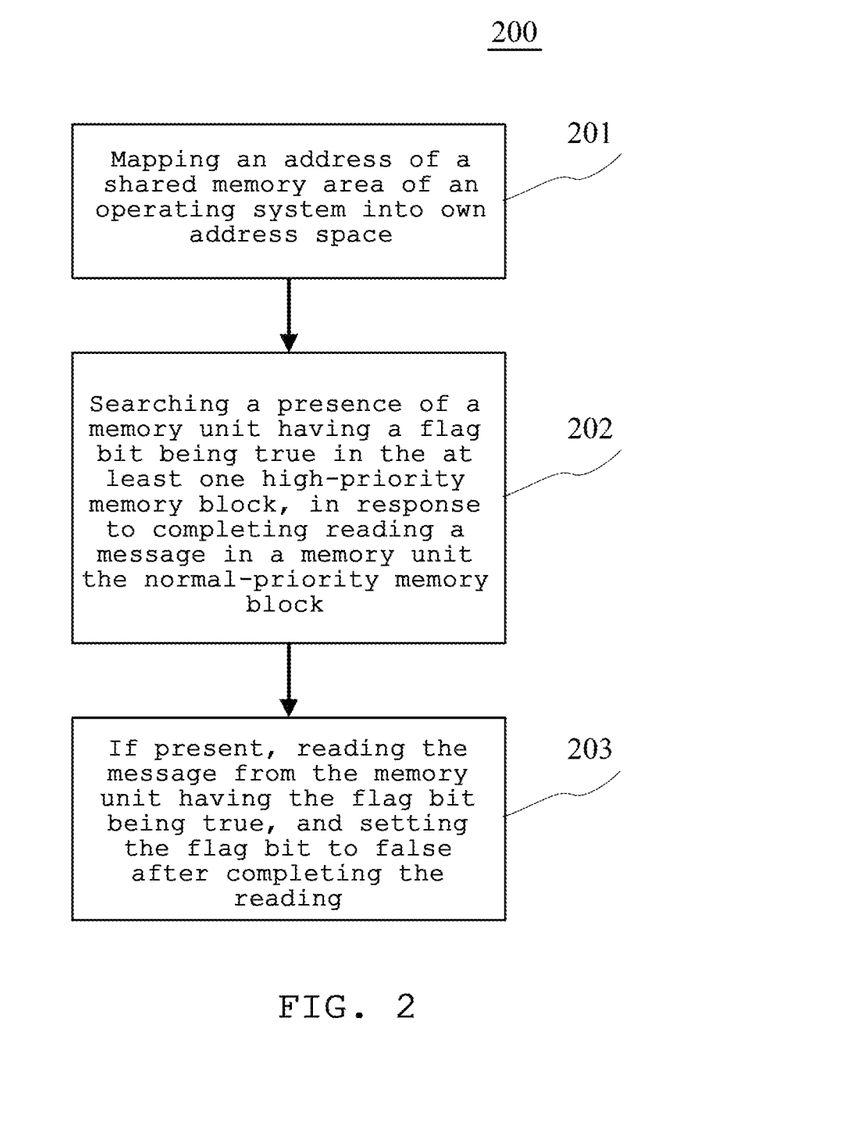
FIG. 2 is a flowchart of another embodiment of a method for transmitting a message according to the present application.

FIG. 2 shows a flow chart 200 of another embodiment of a method for transmitting a message according to the present application. As shown in FIG. 2, the method for transmitting a message of this embodiment comprises the following steps.

At step 201, an address of a shared memory area of an operating system is mapped into own address space.

In this embodiment, a reading message process is referred to as a receiving process or a receiving node, and before it reads the message from the shared memory area, the address of the shared memory area of the operating system should be mapped into own address space, such that a message receiving process accesses the shared memory area like accessing its own memory. The shared memory area may comprise a normal-priority memory block and at least one high-priority memory block, and the normal-priority memory block and the at least one high-priority memory block may each comprise at least one memory unit having the successive serial number. The operating system may be various operating systems, such as a robot operating system (ROS), a Linux operating system, a Unix operating system and so on.

At step 202, a presence of a memory unit having a flag bit being true is searched in the at least one high-priority memory block, in response to completing reading the message in the memory unit of the normal-priority memory block.

In this embodiment, in response to completing reading the message in the memory unit of the normal-priority memory block, the receiving process may search a presence of a memory unit having a flag bit being true in the at least one high-priority memory block. Herein, the flag bit of the memory unit being true may indicate that a message is written into the memory unit by the sending process.

In some optional implementations of this embodiment, the normal-priority memory block may be configured to store the message having a priority of the normal priority, and each high-priority memory block in the at least one high-priority memory block may be configured to store the messages having different levels of high priorities. The above-mentioned searching whether there is the memory unit with a flag bit being true in the at least one high-priority memory block may further be conducted as follows: the receiving process may sequentially search, in a descending order of the priorities of the stored messages, whether the flag bit of each memory unit in the at least one high-priority memory block is true, wherein the searching in each high-priority memory block may be conducted sequentially according to the serial numbers of the memory units.

At step 203, if there is a memory unit with a flag bit being true in the at least one high-priority memory block, the message is read from the memory unit with a flag bit being true, and the flag bit is set to false after completing the reading.

In this embodiment, if the memory unit with a flag bit being true is found from the at least one high-priority memory block, the message is read from the memory unit with a flag bit being true, and the flag bit of the memory unit is set to false after completing the reading.

In some optional implementations of this embodiment, the method for transmitting the message may further comprise: if not present the memory unit with a flag bit being true is found from the at least one high-priority memory block, the receiving process may read a message stored in a memory unit next to the memory unit lastly read in the normal-priority memory block.

The method for transmitting the message provided in the above embodiment of the present application maps the address of the shared memory area into own address space, searches a presence of the memory unit with a flag bit being true in at least one high-priority memory block, in response to completing reading the message in the memory unit of a normal-priority memory block; and if the memory unit can be found, reads a message from the memory unit with a flag bit being true and sets the flag bit to false after completing the reading, thereby reading the message according to the priorities of the messages, such that the messages having different priorities can be transmitted differentially, and the control security of an intelligently control system is improved.

Figure 3:
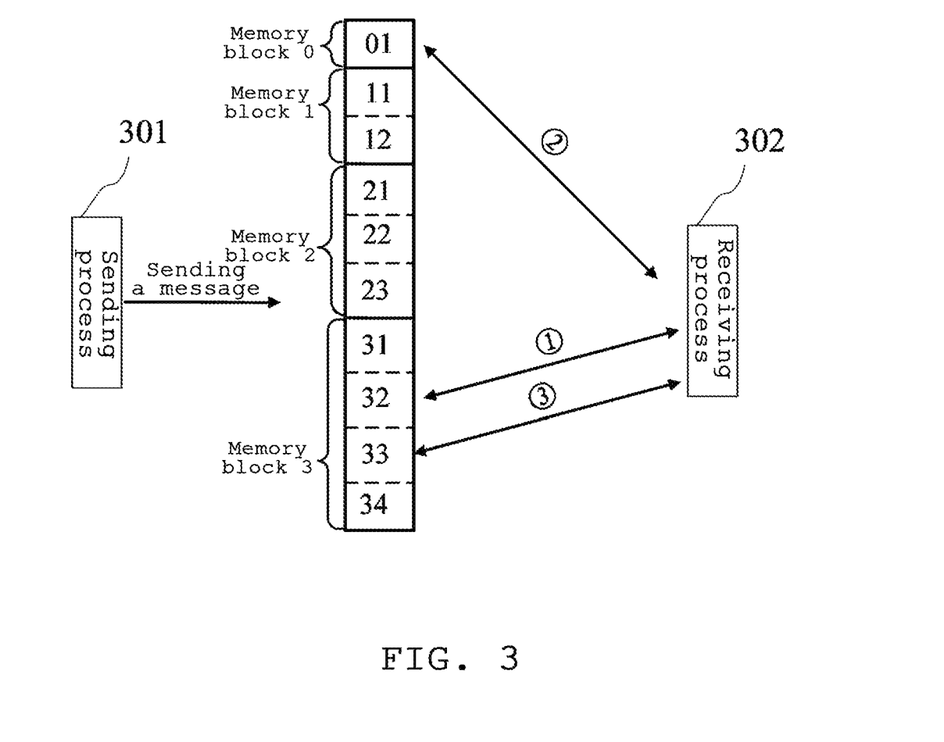
FIG. 3 is a schematic diagram of an application scenario of a method for transmitting a message according to the present application.

Continue to refer to FIG. 3, a schematic diagram of an application scenario of a method for transmitting a message according to this embodiment is shown. In the application scenario of FIG. 3, when messages are stored in the shared memory area, a sending process 301 first divides the shared memory area into a memory block 0, a memory block 1, a memory block 2, and a memory block 3, wherein the memory block 0, the memory block 1, the memory block 2, and the memory block 3 are used to store messages whose priorities are zero, one, two, and three respectively, and the priorities of the messages are arranged as zero, one, two and three in a descending order. Then, the memory block 3 is divided into a memory unit 31, a memory unit 32, a memory unit 33, and a memory unit 34; the memory block 2 is divided into a memory unit 21, a memory unit 22, and a memory unit 23; the memory block 1 is divided into a memory unit 11 and a memory unit 12; and the memory block 0 is used as a memory unit 01. Then, a target memory block for storing a to-be-transmitted message is determined from the memory block 1, the memory block 1, the memory block 2, and the memory block 3 according to the priority of the to-be-transmitted message. Finally, the to-be-transmitted message is written into the memory unit of the target memory block. During a period of reading the message, a receiving process 302 first maps an address of the shared memory area of the operating system into own address space; then, in response to completing reading the message in the memory unit 32 of the normal-priority memory block (that is, the memory block 3) in step ①, finds that a flag bit of the memory unit 01 of the memory block 0 is true, and then conducts step ② of reading the message in the memory unit 01 and setting the flag bit of the memory unit 01 to false after completing the reading; then sequentially finds that the flag bits of the memory unit 11 and the memory unit 12 of the memory block 1 are false, continues to sequentially find that the flag bits of the memory unit 21, the memory unit 22, and the memory unit 23 of the memory block 2 are false, and then conducts step ③ of reading the message in the memory unit 33 next to the memory unit 32.

Figure 4:
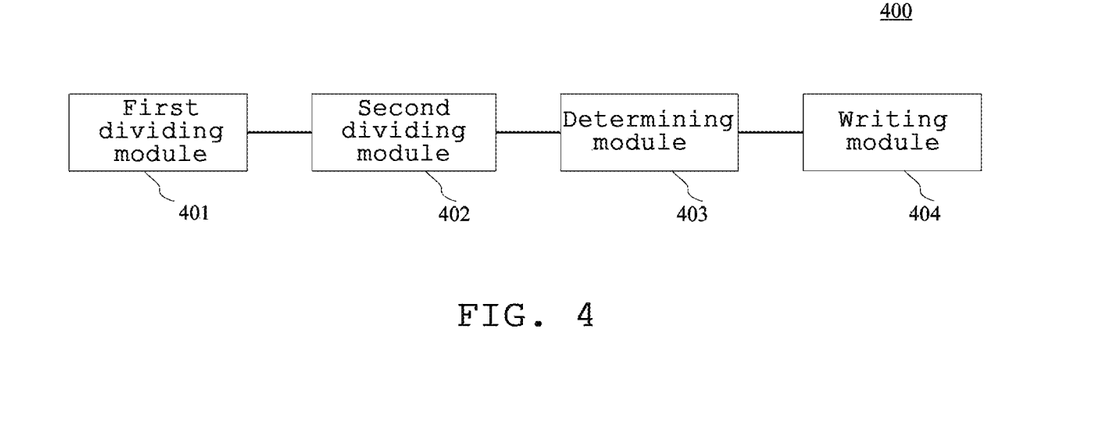
FIG. 4 is a schematic structural diagram of an embodiment of an apparatus for transmitting a message according to the present application.

Further referring to FIG. 4, as an implementation of the method shown in FIG. 1, the present application provides an embodiment of an apparatus for transmitting a message. The apparatus embodiment corresponds to the method embodiment shown in FIG. 1.

As shown in FIG. 4, the apparatus 400 for transmitting the message described in this embodiment comprises: a first dividing module 401, a second dividing module 402, a determining module 403, and a writing module 404. The first dividing module 401 is configured to divide a shared memory area allocated by an operating system into a plurality of memory blocks for storing messages having different priorities. The second dividing module 402 is configured to divide each memory block in the plurality of memory blocks into at least one memory unit having a successive serial number. The determining module 403 is configured to determine, from the plurality of memory blocks according to a priority of a to-be-transmitted message, a target memory block for storing the to-be-transmitted message. The writing module 404 is configured to write the to-be-transmitted message into a memory unit of the target memory block.

In this embodiment, for specific processing of the first dividing module 401, the second dividing module 402, the determining module 403, and the writing module 404, reference may be made to the detailed descriptions of step 101, step 102, step 103, and step 104 of the corresponding embodiment in FIG. 1, and details are not repeated herein.

In some optional implementations of this embodiment, the writing module 404 is further configured to: determine, from the target memory block, a memory unit being currently unwritten, as a to-be-written memory unit of the to-be-transmitted message; write the to-be-transmitted message into the to-be-written memory unit after locking the to-be-written memory unit; and unlock the to-be-written memory unit in response to completion of the writing into the to-be-written memory unit, and send, through broadcasting, a notification of the completion. For this implementation, reference may be made to the detailed description of the corresponding implementation in the corresponding embodiment of FIG. 1, and details are not repeated herein.

In some optional implementations of this embodiment, the first dividing module 401 is further configured to: divide the shared memory area allocated by the operating system into a normal-priority memory block and at least one high-priority memory block, wherein, the priorities of the messages comprise a normal priority and different levels of high priorities, the number of levels of the high priorities corresponds to the number of the at least one high-priority memory block, the normal-priority memory block is configured to store a message having a priority of the normal priority, and the high-priority memory blocks are configured to store messages having different levels of high priorities respectively. For this implementation, reference may be made to the detailed description of the corresponding implementation in the corresponding embodiment of FIG. 1, and details are not repeated herein.

In some optional implementations of this embodiment, the apparatus 400 further comprises: a setting module (not shown), configured to: when the priority of the to-be-transmitted message is the high priority, set a flag bit of the memory unit to true, after the to-be-transmitted message is written into the memory unit of the target memory block. For this implementation, reference may be made to the detailed description of the corresponding implementation in the corresponding embodiment of FIG. 1, and details are not repeated herein.

Figure 5:
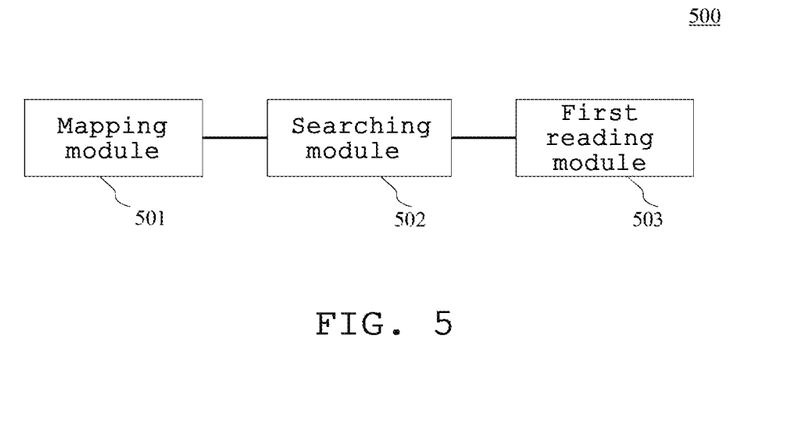
FIG. 5 is a schematic structural diagram of another embodiment of an apparatus for transmitting a message according to the present application.

Further referring to FIG. 5, as an implementation of the methods shown in FIG. 2, the present application provides an embodiment of an apparatus for transmitting a message. The apparatus embodiment corresponds to the method embodiment shown in FIG. 2.

As shown in FIG. 5, the apparatus 500 for transmitting a message described in this embodiment comprises: a mapping module 501, a searching module 502, and a first reading module 503. The mapping module 501 is configured to map an address of a shared memory area of an operating system into own address space, wherein, the shared memory area comprises a normal-priority memory block and at least one high-priority memory block, and the normal-priority memory block and the at least one high-priority memory block each comprise at least one memory unit having a successive serial number; the searching module 502 is configured to search a presence of a memory unit having a flag bit being true in the at least one high-priority memory block, in response to completing reading a message in a memory unit of the normal-priority memory block; and the first reading module 503 is configured to: read a message from the memory unit with a flag bit being true, and set the flag bit to false after completing the reading, if there is the memory unit with a flag bit being true in the at least one high-priority memory block.

In this embodiment, for specific processing of the mapping module 501, the searching module 502, and the first reading module 503, reference may be made to detailed descriptions of step 201, step 202, and step 203 of the corresponding embodiment in FIG. 2, and details are not repeated herein.

In some optional implementations of this embodiment, the apparatus 500 further comprises: a second reading module (not shown), configured to: read a message stored in a memory unit next to a memory unit lastly read in the normal-priority memory block, if there is not a memory unit with a flag bit being true in the at least one high-priority memory block. For this implementation, reference may be made to the detailed description of the corresponding implementation in the corresponding embodiment of FIG. 2, and details are not repeated herein.

In some optional implementations of this embodiment, the normal-priority memory block may be configured to store the message having a priority of the normal priority, and each high-priority memory block in the at least one high-priority memory block may be configured to store the messages having different levels of high priorities; and the searching module 502 is further configured to: sequentially search, in a descending order of the priorities of the stored messages, whether a flag bit of each memory unit in the at least one high-priority memory block is true, wherein the searching in each high-priority memory block may be conducted sequentially according to the serial numbers of the memory units. For this implementation, reference may be made to the detailed description of the corresponding implementation in the corresponding embodiment of FIG. 2, and details are not repeated herein.

Figure 6:
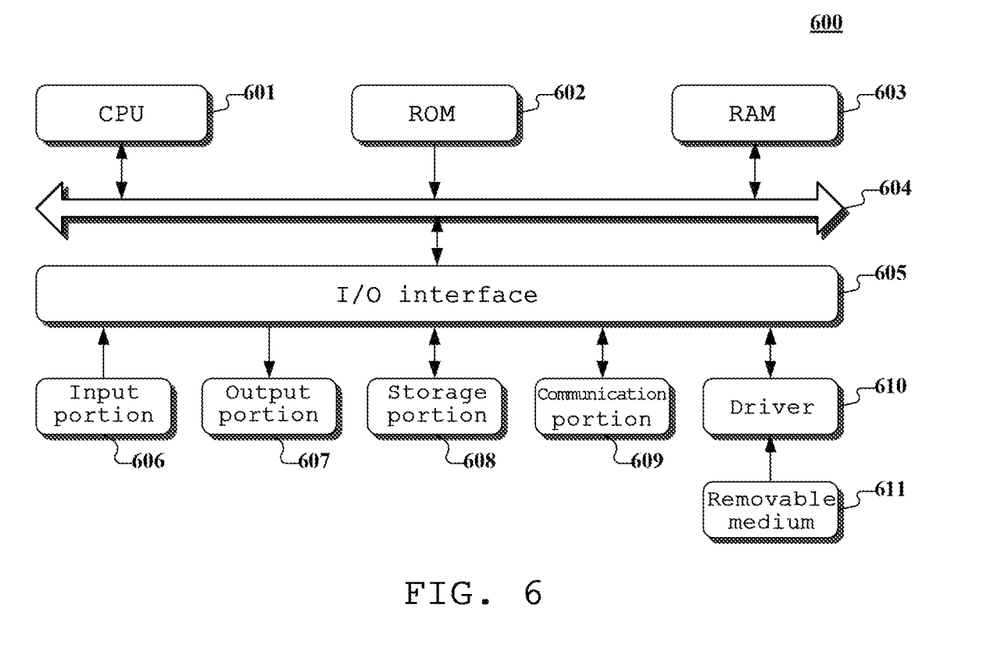
FIG. 6 is a schematic structural diagram of a computer system applicable to implement the apparatus for transmitting a message in the embodiments of the present application.

Referring to FIG. 6, a schematic structural diagram of a computer system 600 adapted to implement a terminal apparatus or a server of the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flowcharts may be implemented in a computer software program. For example, an embodiment of the present disclosure includes a computer program product, which comprises a computer program that is tangibly embedded in a machine-readable medium. The computer program comprises program codes for executing the method of the flowcharts. In such an embodiment, the computer program may be downloaded and installed from a network via the communication portion 609, and/or may be installed from the removable media 611. The computer program is executed by the central processing unit (CPU) 601 to execute the above mentioned functions defined in the method of the present application.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a first dividing module, a second dividing module, a determining module and a writing module, where the names of these modules are not considered as a limitation to the modules. For example, the first dividing module may also be described as "a module for dividing a shared memory area allocated by an operating system into a plurality of memory blocks for storing messages having different priorities".

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs are executed by one device so that the device divides a shared memory area allocated by an operating system into a plurality of memory blocks for storing messages having different priorities; divides each memory block in the plurality of memory blocks into at least one memory unit having a successive serial number; determines, from the plurality of memory blocks according to a priority of a to-be-transmitted message, a target memory block for storing the to-be-transmitted message; and writes the to-be-transmitted message into a memory unit of the target memory block. Alternatively, the one or more programs are executed so that the device maps an address of a shared memory area of an operating system into own address space, wherein the shared memory area comprises a normal-priority memory block and at least one high-priority memory block, each comprising at least one memory unit having a successive serial number; searches a presence of a memory unit having a flag bit being true in the at least one high-priority memory block, in response to completion of reading of a message in a memory unit of the normal-priority memory block; and if present, reads the message from the memory unit with a flag bit being true, and setting the flag bit to false after completing the reading.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for transmitting a message, comprising:
dividing a shared memory area of a non-transitory memory allocated by an operating system into a plurality of memory blocks for storing messages having different priorities, the shared memory area being a memory accessible by different processes in a multi-process operating system, and the shared memory area being requested by a sending process from the operating system, the messages having different priorities being control instructions issued by an intelligent control system during driving of an autonomous vehicle, and a number of memory blocks divided from the shared memory area being equal to a number of levels of priorities of messages to be transmitted by the sending process;
dividing each memory block in the plurality of memory blocks into at least one memory unit having a successive serial number;
determining, from the plurality of memory blocks according to a priority of a to-be-transmitted message, a target memory block for storing the to-be-transmitted message;
writing the to-be-transmitted message into a memory unit of the target memory block; and
wherein when the priority of the to-be-transmitted message is a high priority, the method further comprises:
setting, a flag bit of the memory unit into which the to-be-transmitted message is written to true in response to determining that the priority of the to-be-transmitted message is a high priority.

2. The method according to claim 1, wherein, the writing the to-be-transmitted message into a memory unit of the target memory block comprises:
- determining, from the target memory block, a memory unit being currently unwritten, as a to-be-written memory unit of the to-be-transmitted message;
- writing the to-be-transmitted message into the to-be-written memory unit after the to-be-written memory unit being locked; and
- unlocking the to-be-written memory unit in response to completion of the writing to the to-be-written memory unit, and sending, through broadcasting, a notification of the completion.

3. The method according to claim 1, wherein the dividing a shared memory area allocated by an operating system into a plurality of memory blocks for storing messages having different priorities comprises:
- dividing the shared memory area allocated by the operating system into a normal-priority memory block and at least one high-priority memory block, wherein, the priorities of the messages comprise a normal priority and different levels of high priorities, the number of the levels of the high priorities corresponds to the number of the at least one high-priority memory block, the normal-priority memory block is used for storing a message having a priority of the normal priority, and each of the high-priority memory blocks is used for storing messages having the different levels of high priorities respectively.

4. A method for transmitting a message, comprising:
- mapping an address of a shared memory area of an operating system into own address space, the shared memory area comprising a normal-priority memory block and at least one high-priority memory block, each comprising at least one memory unit having a successive serial number, the shared memory area being a memory accessible by different processes in a multi-process operating system, and the shared memory area being requested by a sending process from the operating system, messages having different priorities stored in memory blocks of the shared memory area being control instructions issued by an intelligent control system during driving of an autonomous vehicle, and a number of memory blocks divided from the shared memory area being equal to a number of levels of priorities of messages to be transmitted by the sending process;
- searching a presence of a memory unit having a flag bit being true in the at least one high-priority memory block, in response to completing reading a message in a memory unit of the normal-priority memory block, wherein the memory unit having the flag bit being true stores a message with a high priority; and
- if present, reading the message from the memory unit having the flag bit being true, and setting the flag bit to false after completing the reading.

5. The method according to claim 4, further comprising:
- if not present, reading a message stored in a memory unit next to a memory unit lastly read in the normal-priority memory block.

6. The method according to claim 4, wherein the normal-priority memory block is configured to store a message having a priority of a normal priority, and each high-priority memory block in the at least one high-priority memory block is configured to respectively store messages having different levels of high priorities; and the searching a presence of a memory unit with a flag bit being true in the at least one high-priority memory block comprises:
- searching sequentially, in a descending order of the priorities of the stored messages, whether a flag bit of each memory unit in the at least one high-priority memory block is true, wherein the determining in each high-priority memory block is carried out sequentially according to serial numbers of the memory units.

7. A system for transmitting a message, comprising:
- at least one processor; and
- a memory storing instructions, which when executed by the at least one processor, cause the at least one processor to perform operations, the operations comprising:
- dividing a shared memory area allocated by an operating system into a plurality of memory blocks for storing messages having different priorities, the shared memory area being a memory accessible by different processes in a multi-process operating system, and the shared memory area being requested by a sending process from the operating system; the messages having different priorities being control instructions issued by an intelligent control system during driving of an autonomous vehicle, and a number of memory blocks divided from the shared memory area being equal to a number of levels of priorities of messages to be transmitted by the sending process;
- dividing each memory block in the plurality of memory blocks into at least one memory unit having a successive serial number;
- determining, from the plurality of memory blocks according to a priority of a to-be-transmitted message, a target memory block for storing the to-be-transmitted message;
- writing the to-be-transmitted message into a memory unit of the target memory block; and
- setting a flag bit of the memory unit into which the to-be-transmitted message is written to true in response to determining that the priority of the to-be-transmitted message is a high priority.

8. The system according to claim 7, wherein, the writing the to-be-transmitted message into a memory unit of the target memory block comprises:
- determining, from the target memory block, a memory unit being currently unwritten, as a to-be-written memory unit of the to-be-transmitted message;
- writing the to-be-transmitted message into the to-be-written memory unit after the to-be-written memory unit being locked; and
- unlocking the to-be-written memory unit in response to completion of the writing to the to-be-written memory unit, and sending, through broadcasting, a notification of the completion.

9. The system according to claim 7, wherein the dividing a shared memory area allocated by an operating system into a plurality of memory blocks for storing messages having different priorities comprises:
- dividing the shared memory area allocated by the operating system into a normal-priority memory block and at least one high-priority memory block, wherein, the priorities of the messages comprise a normal priority and different levels of high priorities, the number of the levels of the high priorities corresponds to the number of the at least one high-priority memory block, the normal-priority memory block is used for storing a message having a priority of the normal priority, and each of the high-priority memory blocks is used for storing messages having the different levels of high priorities respectively.

10. A system for transmitting a message, comprising:

at least one processor; and a memory storing instructions, which when executed by the at least one processor, cause the at least one processor to perform operations, the operations comprising:

mapping an address of a shared memory area of an operating system into own address space, the shared memory area comprising a normal-priority memory block and at least one high-priority memory block, each comprising at least one memory unit having a successive serial number, the shared memory area being a memory accessible by different processes in a multi-process operating system, and the shared memory area being requested by a sending process from the operating system, messages having different priorities stored in memory blocks of the shared memory area being control instructions issued by an intelligent control system during driving of an autonomous vehicle, and a number of memory blocks divided from the shared memory area being equal to a number of levels of priorities of messages to be transmitted by the sending process;

searching a presence of a memory unit having a flag bit being true in the at least one high-priority memory block, in response to completing reading a message in a memory unit of the normal-priority memory block, wherein the memory unit having the flag bit being true stores a message with a high priority; and if present, reading the message from the memory unit having the flag bit being true, and setting the flag bit to false after completing the reading.

11. The system according to claim 10, the operations further comprising:

if not present, reading a message stored in a memory unit next to a memory unit lastly read in the normal-priority memory block.

12. The system according to claim 10, wherein the normal-priority memory block is configured to store a message having a priority of a normal priority, and each high-priority memory block in the at least one high-priority memory block is configured to respectively store messages having different levels of high priorities; and the searching a presence of a memory unit with a flag bit being true in the at least one high-priority memory block comprises:

searching sequentially, in a descending order of the priorities of the stored messages, whether a flag bit of each memory unit in the at least one high-priority memory block is true, wherein the determining in each high-priority memory block is carried out sequentially according to serial numbers of the memory units.

* * * * *